United States Patent
Andersson et al.

(10) Patent No.: US 7,324,710 B2
(45) Date of Patent: Jan. 29, 2008

(54) METHOD AND DEVICE FOR DETERMINING NOMINAL DATA FOR ELECTRONIC CIRCUITS BY CAPTURING A DIGITAL IMAGE AND COMPARE WITH STORED NOMINAL DATA

(75) Inventors: Niklas Andersson, Hägersten (SE); Simon Sandgren, Spånga (SE); Johan Åberg, Skogås (SE)

(73) Assignee: Mydata Automation AB, Bromma (SE)

( * ) Notice: Subject to any disclaimer, the term of this patent is extended or adjusted under 35 U.S.C. 154(b) by 634 days.

(21) Appl. No.: 10/240,561

(22) PCT Filed: Apr. 27, 2001

(86) PCT No.: PCT/SE01/00916

§ 371 (c)(1),
(2), (4) Date: Oct. 22, 2002

(87) PCT Pub. No.: WO01/84499

PCT Pub. Date: Nov. 8, 2001

(65) Prior Publication Data

US 2003/0113039 A1 Jun. 19, 2003

(30) Foreign Application Priority Data

Apr. 28, 2000 (SE) .................................. 0001577

(51) Int. Cl.
*G06K 9/60* (2006.01)
(52) U.S. Cl. ...................... 382/305; 382/216; 382/219; 382/278; 358/537; 358/452
(58) Field of Classification Search ............... 382/141, 382/145, 151, 152, 143, 147, 305, 209, 216, 382/218, 219, 278; 700/186, 193; 358/537, 358/448, 452

See application file for complete search history.

(56) References Cited

U.S. PATENT DOCUMENTS 4,790,564 A     12/1988 Larcher et al.

(Continued)

FOREIGN PATENT DOCUMENTS

CN        1043580 A      7/1990

(Continued)

OTHER PUBLICATIONS

English language translation for Patent Abstract of Japanese Patent Publication No. 11-183146, date of publication of application Jul. 9, 1999, Inventors Machii Nobukatsu.

(Continued)

*Primary Examiner*—Yosef Kassa
(74) *Attorney, Agent, or Firm*—Birch, Stewart, Kolasch & Birch, LLP

(57) ABSTRACT

A method and a corresponding device for determining nominal mechanical data for an electronic device by automatic image processing of a digital image of a specimen of said electronic device. In the method, an object in said digital image, which object corresponds to said specimen, is identified and appearance data for the appearance of the identified object are determined. Then, at least some of the determined appearance data are compared with a stored set of nominal appearance data, which nominal appearance data are based on a prior knowledge of appearances of electronic devices, and at least some nominal appearance data of the set of nominal appearance data are selected. Finally, the nominal mechanical data of the electronic device is determined in accordance with the selected nominal appearance data and at least some of the determined appearance data.

30 Claims, 6 Drawing Sheets

U.S. PATENT DOCUMENTS

| | | |
|---|---|---|
| 5,119,436 A | 6/1992 | Holdgrafer |
| 5,185,811 A | 2/1993 | Beers et al. |
| 5,245,671 A * | 9/1993 | Kobayashi et al. .......... 382/150 |
| 5,386,481 A * | 1/1995 | Hine et al. ................... 382/145 |
| 5,469,294 A | 11/1995 | Wilt et al. |
| 5,521,517 A * | 5/1996 | Shida et al. ................. 324/751 |
| 5,555,316 A | 9/1996 | Tsujikawa et al. |
| 5,646,681 A | 7/1997 | Okazaki |
| 5,740,062 A * | 4/1998 | Berken et al. ............... 700/218 |
| 5,777,327 A * | 7/1998 | Mizuno ....................... 250/310 |
| 5,822,449 A | 10/1998 | Kobayashi et al. |
| 5,894,530 A | 4/1999 | Wilt |
| 5,969,752 A | 10/1999 | Belter |
| 6,026,176 A | 2/2000 | Whitman |
| 6,225,639 B1 * | 5/2001 | Adams et al. ............ 250/559.4 |
| 6,275,742 B1 * | 8/2001 | Sagues et al. ............... 700/213 |
| 6,326,618 B1 * | 12/2001 | Kane et al. .................. 250/307 |
| 6,411,867 B1 * | 6/2002 | Sakiyama et al. .............. 701/1 |
| 6,464,636 B1 * | 10/2002 | Kinicki et al. ............... 600/437 |
| 6,584,213 B2 * | 6/2003 | Prakash et al. .............. 382/107 |
| 6,704,653 B2 * | 3/2004 | Kuriya et al. ................ 701/301 |
| 6,718,227 B1 * | 4/2004 | Schemmel et al. ......... 700/213 |
| 6,895,109 B1 * | 5/2005 | Schemmel et al. ......... 382/149 |
| 6,999,623 B1 * | 2/2006 | Yamaoka et al. ........... 382/209 |

FOREIGN PATENT DOCUMENTS

| | | |
|---|---|---|
| CN | 1201953 A | 12/1998 |
| EP | 0 920 792 B1 | 6/1999 |
| JP | 9079995 | 3/1997 |
| WO | WO 97/19416 | 5/1997 |
| WO | WO 99/30545 | 6/1999 |
| WO | WO 99/56075 | 11/1999 |
| WO | WO 00/08588 | 2/2000 |

OTHER PUBLICATIONS

English language translation for Patent Abstract of Japanese Patent Publication No. 06-201339, date of publication of application Jul. 19, 1994, Inventors Ishibane Masato et al.

English language translation for Patent Abstract of Japanese Patent Publication No. 08-180191, date of publication of application Jul. 12, 1996, Inventor Kawada Tosuke.

English language translation for Patent Abstract of Japanese Patent Publication No. 06-120095, date of publication of application Apr. 28, 1994, Inventor Garcia Douglas J.

* cited by examiner

METHOD AND DEVICE FOR DETERMINING NOMINAL DATA FOR ELECTRONIC CIRCUITS BY CAPTURING A DIGITAL IMAGE AND COMPARE WITH STORED NOMINAL DATA

This application is the national phase under 35 U.S.C. 0 371 of PCT International Application No. PCT/SE01/00916, which has an International filing date of Apr. 27, 2001, and which designated the United States of America.

TECHNICAL FIELD OF THE INVENTION

The present invention relates to a method and a corresponding device for determining nominal mechanical data for an electronic device by means of automatic image processing of a digital image of a specimen of said electronic device. Furthermore, the present invention relates to computer readable medium having computer-executable instructions for a general-purpose computer including means for automatic image processing to perform said method.

TECHNICAL BACKGROUND OF THE INVENTION

When mounting components on a printed circuit board using a component mounting machine there is a need for close precision. In order to achieve this an image processing device is often used for obtaining and analysing an image of the component after it has been picked up by means of a pick-up head. The aim of the analysis is to determine the exact position of the component on the pick-up head before it is mounted on the printed circuit board. When the position of the component to be mounted is known, the component mounting machine can compensate for the translation and rotation of the component before it is mounted on the printed circuit board. During the analysis, the image is compared with stored mechanical data of the component in order to be able to determine the position of the component to be mounted. For example, the positions of objects in the image corresponding to leads on the component to be mounted are compared with stored mechanical data that describe the nominal positions of leads on the relevant type of component. Furthermore, in the analysis the component to be mounted can be examined for faults, such as missing leads, erroneous leads or incorrectly positioned leads.

To be able to do the above analysis, component mounting machines are provided with a database with mechanical data for the most common components. However, due to the large amount of new components that are continuously introduced on the market the databases need to be continuously updated with mechanical data for these new components. Furthermore, for cases where the components to be mounted are components that are more rare, the database may not include mechanical data for this type of component. Hence, the database needs to be updated with mechanical data for these rare components when they are to be used.

Today, when updating the database with mechanical data for a component, the mechanical data are often derived from drawings or the like of the component and entered into the database manually. This is a time consuming task and there is always a risk that data is erroneously entered due to the human factor. Furthermore, in some cases drawings of the component are not available or the form of the available drawings are not suited for extracting the mechanical data of interest. Consequently, alternative methods that are automatic or semi-automatic have been developed where pictures of a single specimen or a number of specimens of a component are taken. The mechanical data for the single specimen or an average of the mechanical data for the number of specimens is then determined and stored in the database. The specimens used in this method are preferably specimens that have been produced with a very close precision.

The automatic methods have several disadvantages to the manual method. One disadvantage is that the mechanical data that are the result of any of these methods will differ to some extent from the mechanical data for a correct specimen of the component. This is due to the fact that the mechanical data stored are mechanical data for specimens of the component. These specimens may be rather exact but they always involve some errors in respect to the nominal mechanical data for the component. Another disadvantage is that it is difficult to calibrate the image processing device in order to get a correct scale in the image.

SUMMARY OF THE INVENTION

A general object of the invention is to be able to automatically determine accurate nominal mechanical data for an electronic device. This object is achieved by a method and a device according to the accompanying claims.

The invention is based on the recognition that, even though nominal mechanical data has not been determined for an electronic device, there is some a priori knowledge of the appearance of the electronic device. This a priori knowledge is a result of the fact that electronic devices often are assembled according to standardised rules for characteristic features of the electronic device. Examples of characteristic features are the size and shape of the electronic device or parts of the electronic device, the positions of parts of or reference points on the electronic device, etc. The standardised rules for the characteristic features are, for example, that the electronic device or parts of the electronic device may only have a limited number of optional standardised sizes and shapes, that parts of or reference points on the electronic device may only have a limited number of optional standardised patterns and spacing, etc. Accordingly, nominal appearance data can be determined for each of the options for a standardised rule resulting in a set of nominal appearance data.

According to one aspect of the invention, a method for determining nominal mechanical data for an electronic device by means of automatic image processing of a digital image of a specimen of the electronic device is provided, wherein an object in the digital image, which object corresponds to the specimen, is identified and appearance data for the appearance of the identified object are determined. Then, at least some of the determined appearance data are compared with a stored set of nominal appearance data, which nominal appearance data are based on a priori knowledge of appearances of electronic devices, and at least some nominal appearance data of the set of nominal appearance data are selected. Finally, the nominal mechanical data of the electronic device is determined in accordance with the selected nominal appearance data and at least some of the determined appearance data.

The method according to the invention provides a way to determine nominal data for an electronic device without having access to drawings or the like of the electronic device. Furthermore, it enables this to be done using image processing of an image of a specimen of the electronic device, which specimen need not be completely accurate. The reason for why this can be done is that it has been recognised that there exists from the start in fact a priori knowledge of the appearance of the electronic device, and that this a priori knowledge could be used in the determining of the nominal mechanical data. As described above, the a priori knowledge resides in the standardised rules for characteristic features of electronic devices. The set of nominal appearance data is correlated to these standardised rules. An advantage of the method according to the invention compared to the known manual methods is that the manual entering of mechanical data is not needed, which makes the method more time effective and more reliable. An advantage of the method according to the invention compared to the known automatic methods is that the determined nominal mechanical data are more accurate. This is due to the use of the nominal appearance data in the method according to the invention, as opposed to the known automatic methods where the determined mechanical data are the averages of mechanical data for a number of specimens of the electronic device. Another advantage of the method according to the invention is that it enables the determination of the nominal mechanical data using only one specimen of the component, which makes the method more time effective than the known automatic methods in which a number of specimens are needed. Note that this does not exclude that the method according to the invention is used for more than one specimen and that the results for these specimens are compared in order to decrease the risk of erroneous determination of nominal mechanical data due to large errors in one specimen.

It should be noted that the appearance data need not be a direct measure of the mechanical data of interest, but may also correspond indirectly to the mechanical data. Thus, the expression "in accordance with" should be interpreted as including an indirect correspondence between the nominal appearance data and the nominal mechanical data. An indirect correspondence between the appearance data and the mechanical data is advantageous when the mechanical data of interest are difficult to determine. In this case appearance data that are easy to determine are determined and compared with a set of corresponding, nominal appearance data. A priori knowledge of the correspondence between the nominal appearance data and the nominal mechanical data is then used in order to determine the nominal mechanical data.

In the method according to the invention, the nominal appearance data of the set of nominal appearance data that show most resemblance to the determined appearance data are preferably selected. In this way a simple criterion can be used to find the nominal appearance data when determining the nominal mechanical data.

Depending on the type of electronic device for which nominal mechanical data are to be determined, the a priori knowledge will differ and thus the set of nominal appearance data will differ. When the electronic device has a number of characteristic parts that are positioned on the electronic device according to a standardised rule, the set of nominal appearance data preferably comprises nominal position data for positions of characteristic parts of electronic devices. In this case, characteristic objects of the identified object in the digital image are identified, which characteristic objects correspond to the characteristic parts of said electronic device, and position data for the positions of the identified characteristic objects are determined and compared with the set of nominal position data. The positions of the characteristic parts are then determined in accordance with the determined position data and the selected nominal position data. One advantage is that by using not only the determined position data but also the nominal position data the nominal positions of the characteristic parts can be determined more accurately.

In a particular case, when the characteristic parts are positioned on the electronic device according to a grid with equal distances between grid points, the nominal position data preferably correspond to standardised distances between grid points. This enables the determination of nominal mechanical data for the positions of characteristic parts of the electronic device by first identifying the characteristic parts on the electronic device and then determining a common distance between them. Then, a nominal distance of a set of nominal distances between grid points that the determined common distance is most likely to correspond to is identified. Finally, the positions of the characteristic parts are determined by adapting the identified characteristic parts to a grid with the identified nominal distance between grid points. This has the advantage that the positions of an unknown number of characteristic parts of an electronic device positioned according to a grid in a subset of grid points can be determined with a high accuracy.

A preferred way of finding the common distance between the characteristic objects is by means of frequency analysis of said position data. In this way the frequency of the characteristic objects in the spatial domain is identified. This has an advantage compared to, for example, just calculating the average closest distance between characteristic objects. For example, if the positions of the characteristic parts of the electronic device are such that in some grid points there are no characteristic parts, i.e. some characteristic parts may have a closest distances to neighbouring characteristic parts that is a multiple of the distance between grid points, this will not affect the frequency corresponding to the distance between grid points when using frequency analysis. The common distance between characteristic objects can then be determined from this frequency, giving a determined common distance between characteristic objects that is not affected by the fact that some characteristic parts may have a closest distance to neighbouring characteristic parts that is a multiple of the distance between grid points.

In a preferred way of identifying characteristic objects in a method according to the invention, a template for the appearance of a characteristic object in the digital image is determined and the digital image is searched for objects that matches the template. Then, the characteristic objects are identified among the found objects. The introduction of a template has been shown to give a much higher reliability of the identification than known methods, i.e. the number of characteristic objects that are missed and the number of objects that are erroneously identified as characteristic objects can be decreased substantially. Furthermore, the template can be determined from the digital image by first identifying a subset of the characteristic objects in said digital image, and then determining the appearance of each characteristic object of the identified subset. The template is then determined as the average of the appearances of the characteristic objects of said identified subset. Since only a subset of the characteristic objects need to be identified to determine a template, one of the known methods can be used for this identification, whereas the method according to the invention using the template is employed to identify all of the characteristic objects.

Note that, when the electronic device has a number of characteristic parts for which the nominal positions should be determined, the method according to the invention further enables the determination of nominal position data for the characteristic parts even in the case when the characteristic objects identified in the method do not have a one-to-one correspondence to the characteristic parts, i.e. if one or more characteristic parts have not been successfully identified or if one or more characteristic objects do not correspond to characteristic parts. More specifically, if the comparison of the determined position data with the set of nominal position data indicates that there are one or more characteristic parts for which no corresponding characteristic objects have been identified, the nominal positions of these one or more characteristic parts are determined in accordance with the set of nominal position data. In one example it is determined that there are one or more characteristic parts for which no corresponding characteristic objects have been identified for the case when the set of nominal position data comprises one or more positions having no correspondence in the determined position data. Furthermore, if the comparison of the determined position data with said set of nominal position data indicates that there are one or more characteristic objects that do not correspond to characteristic parts, the nominal positions for said one or more characteristic objects are not determined. In one example it is determined that there are one or more characteristic objects that do not correspond to characteristic parts for the case when said set of determined position data comprises one or more positions having no correspondence in said nominal position data.

Thus, accurate nominal mechanical data can be determined even if the identification of characteristic parts is not accurate.

BRIEF DESCRIPTION OF THE DRAWINGS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will now be further elucidated by way of exemplary embodiments described hereinafter with reference to the accompanying drawings, which are given by way of illustration only, and thus are not limitative of the present invention, and in which.

DETAILED DESCRIPTION OF PREFERRED EMBODIMENTS OF THE INVENTION

Figure 1:
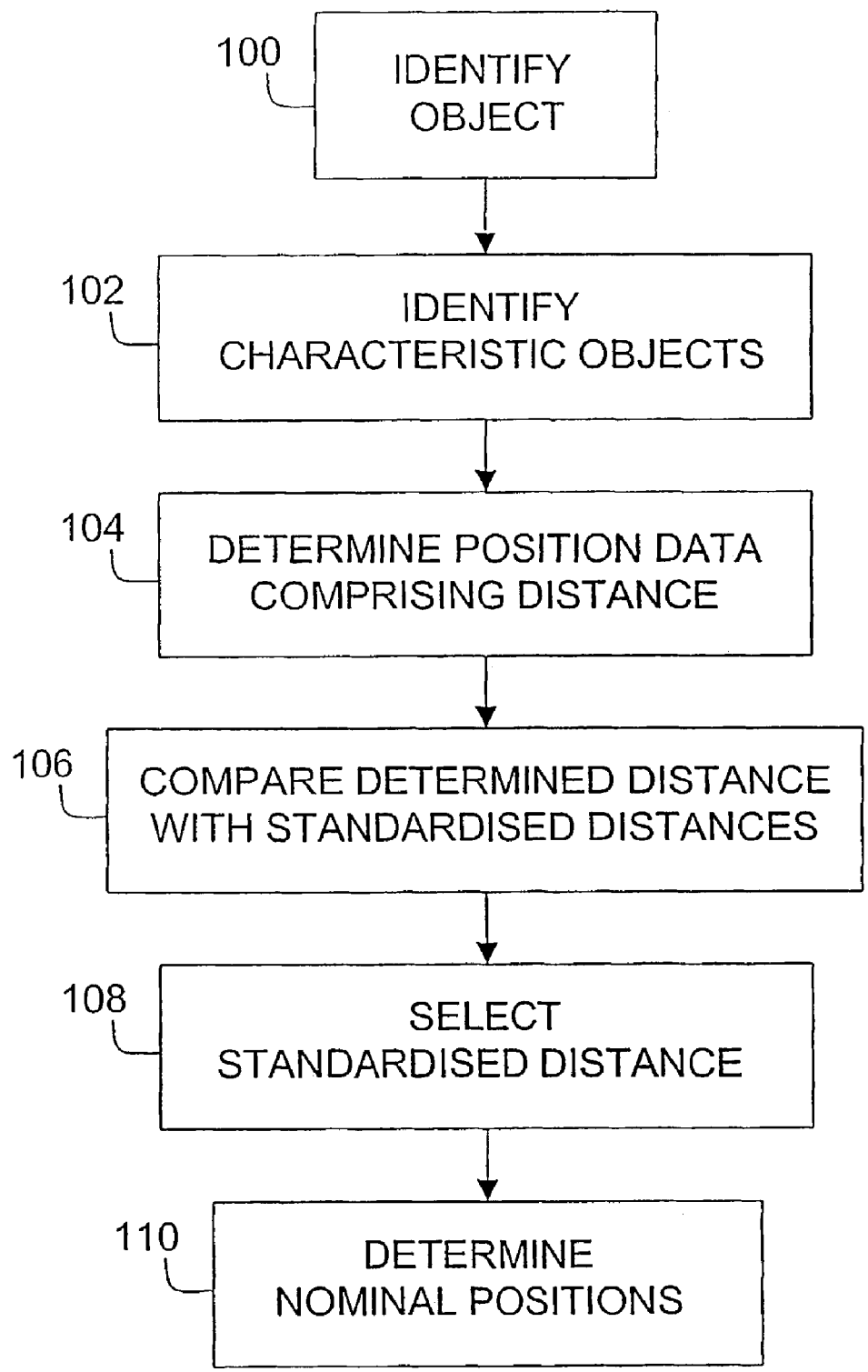
FIG. 1 shows a flow chart of a method for determining the nominal positions of leads on a component by means of automatic image processing of a digital image of a specimen of the component in accordance with the invention.

In FIG. 1 a flow chart of a method for determining the nominal positions of leads on a component by means of automatic image processing of a digital image of a specimen of the component in accordance with the invention is shown. The method uses automatic image processing of a digital image of a specimen of the component for which the nominal positions of leads should be determined. The method is adapted to components for which the leads are placed in some or all grid points of a grid and for which the centre distance between two neighbouring leads is a multiple of the distance between grid points. In step 100 an object is identified in the digital image, which object corresponds to the specimen. This identification is done using any known method of identifying objects in a digital image by means of image processing. In step 102 characteristic objects corresponding to leads on the component are identified. This identification may also be done using any known method of identifying objects in a digital image by means of image processing, but is preferably done using a method described hereinafter with reference to FIG. 4. After the characteristic objects have been identified position data are determined for the positions of them in step 104. The position data comprise a common centre distance between the characteristic objects and the positions of the characteristic objects. For a component with leads in all grid points, the common centre distance could be calculated as the average closest centre distance between leads, i.e. the average of all the distances between the centres of neighbouring leads. For other components the common centre distance is preferably calculated according to the method described hereinafter with reference to FIG. 2. When the common centre distance has been determined it is compared with a set of nominal position data in step 106. The set of nominal position data is based on a priori knowledge of the positions of leads. In this case the leads are placed in some or all grid points of a grid and thus the centre distance between neighbouring leads is a multiple of the distance between grid points. The a priori knowledge is that there is a set of standardised distances between grid points. Thus, the set of nominal position data is chosen to be a set of standardised distances between grid points. In step 108 the standardised distance between grid points, of the set of standardised distances between grid points, that is closest to the determined common centre distance is selected. Finally, in step 110 the nominal positions of leads on the component are determined in accordance with the selected standardised distance between grid points and the determined positions of the characteristic objects. This is done by adapting the determined positions to a grid with the selected standardised distance between grid points.

Figure 2:
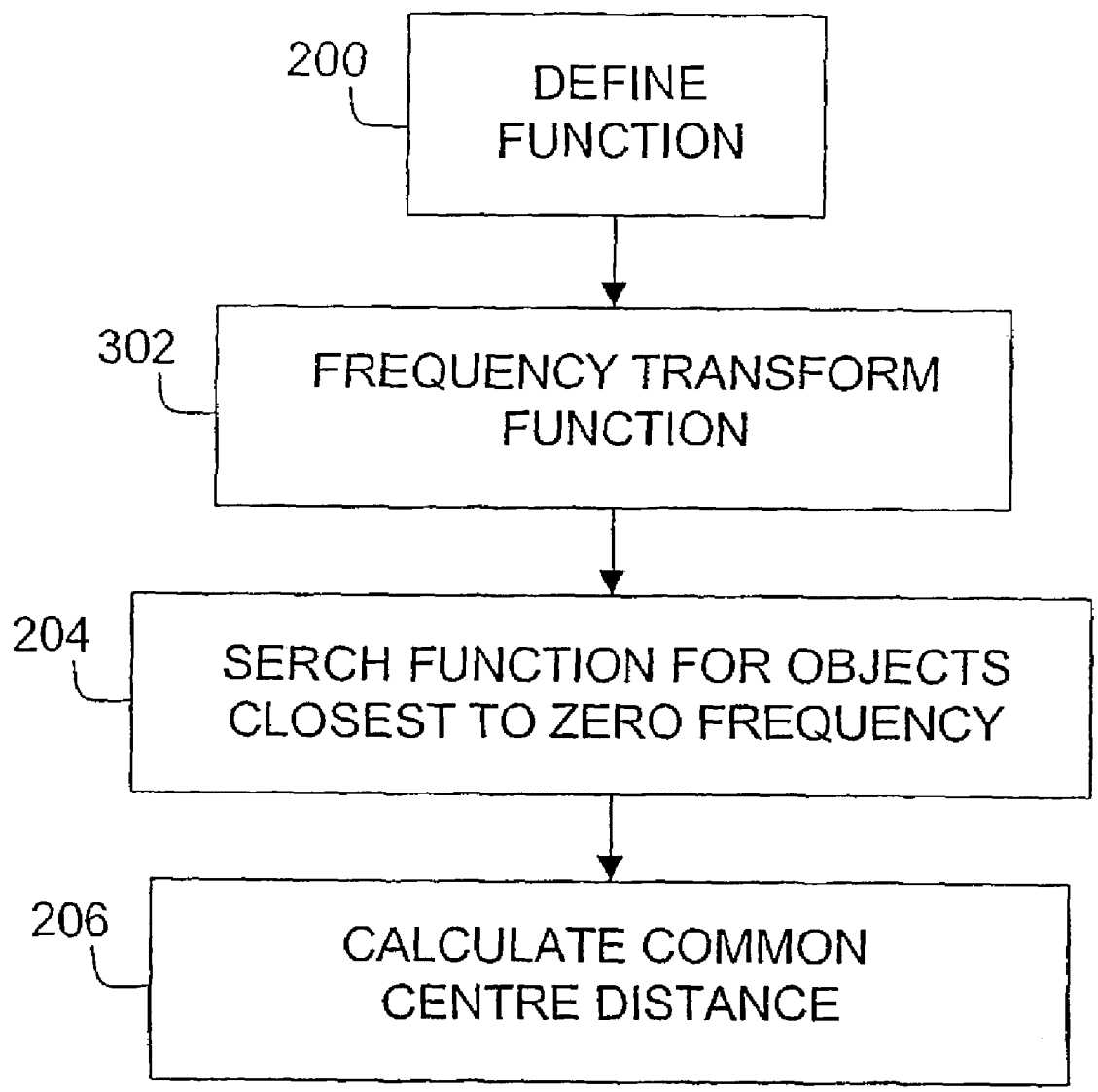
FIG. 2 shows a flow chart of a method for calculating a common centre distance between characteristic objects in a digital image in accordance with the invention.
Figure 3A:
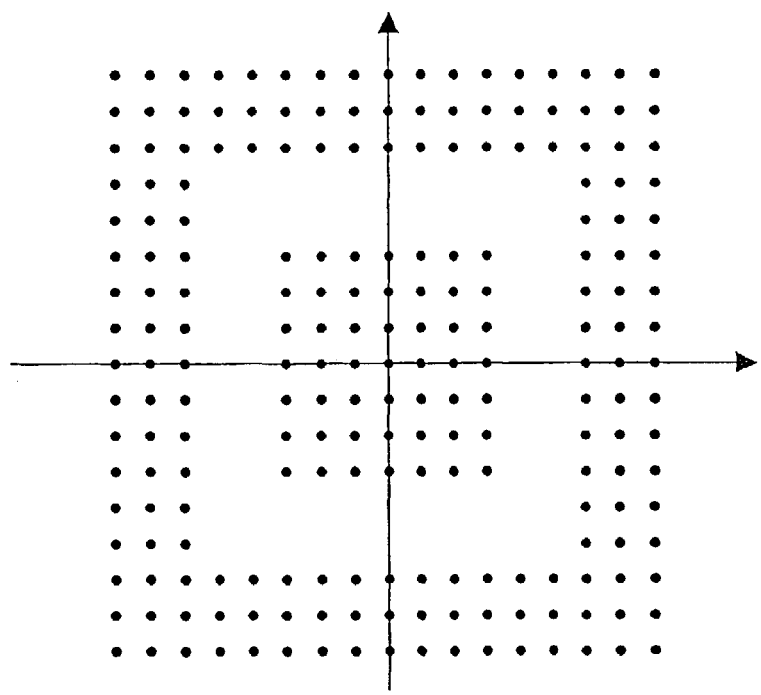
FIGS. 3A and 3B show a binary image of a specimen of a component in the spatial domain and a part of a binary image of the specimen transformed to the frequency domain, respectively.
Figure 3B:
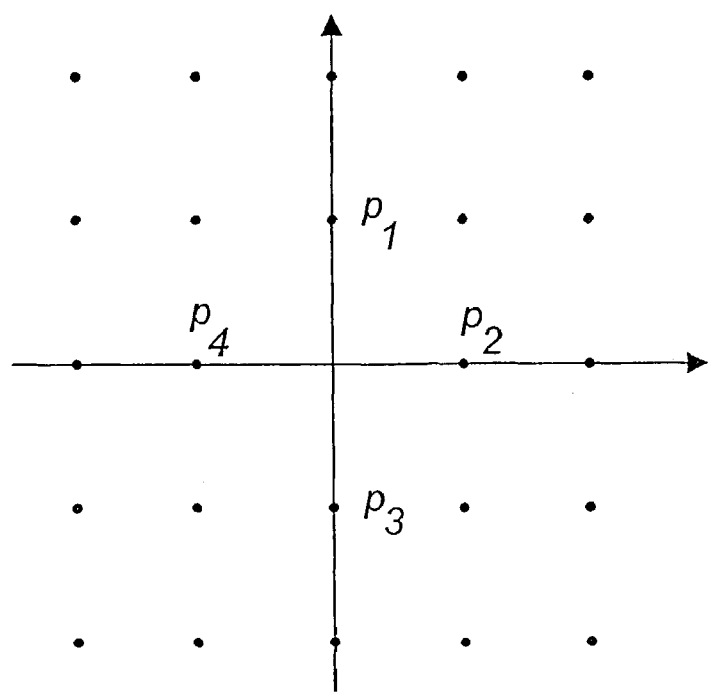

Referring now to FIG. 2, a flow chart of a method for calculating a common centre distance between characteristic objects in a digital image in accordance with the invention is shown. This method can be used in step 104 in the method described with reference to FIG. 1, where the digital image comprises a matrix of M×M pixels, see FIG. 3A. In step 200 a two-dimensional function is defined of the pixels in the image. The function has a value of 1 for a pixel that corresponds to the position of one of the identified characteristic objects and a value 0 for all other pixels. Of course, any values can be chosen as long as the values enable the distinction between pixels that correspond to the identified characteristic objects and other pixels. This function gives rise to a binary image of the specimen. The function, i.e. the binary image, is then frequency transformed in step 202 using a discreet two-dimensional Fourier transform. The choice of the discreet Fourier transform is just an example; any suitable frequency transform may be used in this step. The Fourier transform of the function now gives rise to a new image of the specimen in the frequency domain (see FIG. 3B) with objects corresponding to the frequency of characteristic objects in the spatial domain. In this image, the four objects that are closest to the point corresponding to zero frequency are affected by, and only by, the centre distances between the identified characteristic objects in the spatial domain that correspond to the distance between grid points. Centre distances between characteristic objects that are two times the distance between nominal grid points or more, do not affect these four objects in the frequency domain. Thus, in step 204 the Fourier transformed function is searched for the four objects $p_1$, $p_2$, $p_3$, $p_4$ (see FIG. 3B) that are closest to the point corresponding to zero frequency. From these four objects the common centre distance between leads p that correspond to the distance between grid points in the grid according to which the leads are positioned on the specimen is determined in step 206. The common centre distance is calculated by first calculating the common centre distance in horizontal direction $p_x$ and vertical direction $p_y$ according to $p_x = M/\|p_2 - p_4\|$ and $p_y = M/\|p_1 - p_3\|$, respectively, and then calculating the common centre distance p according to $p = (p_x + p_y)/2$. As can be seen from the equations above the method also enables the calculation of a separate vertical and horizontal distance. Thus, components with leads that are placed on the component according to a grid that has different vertical and horizontal distances between grid points can be determined.

Figure 4:
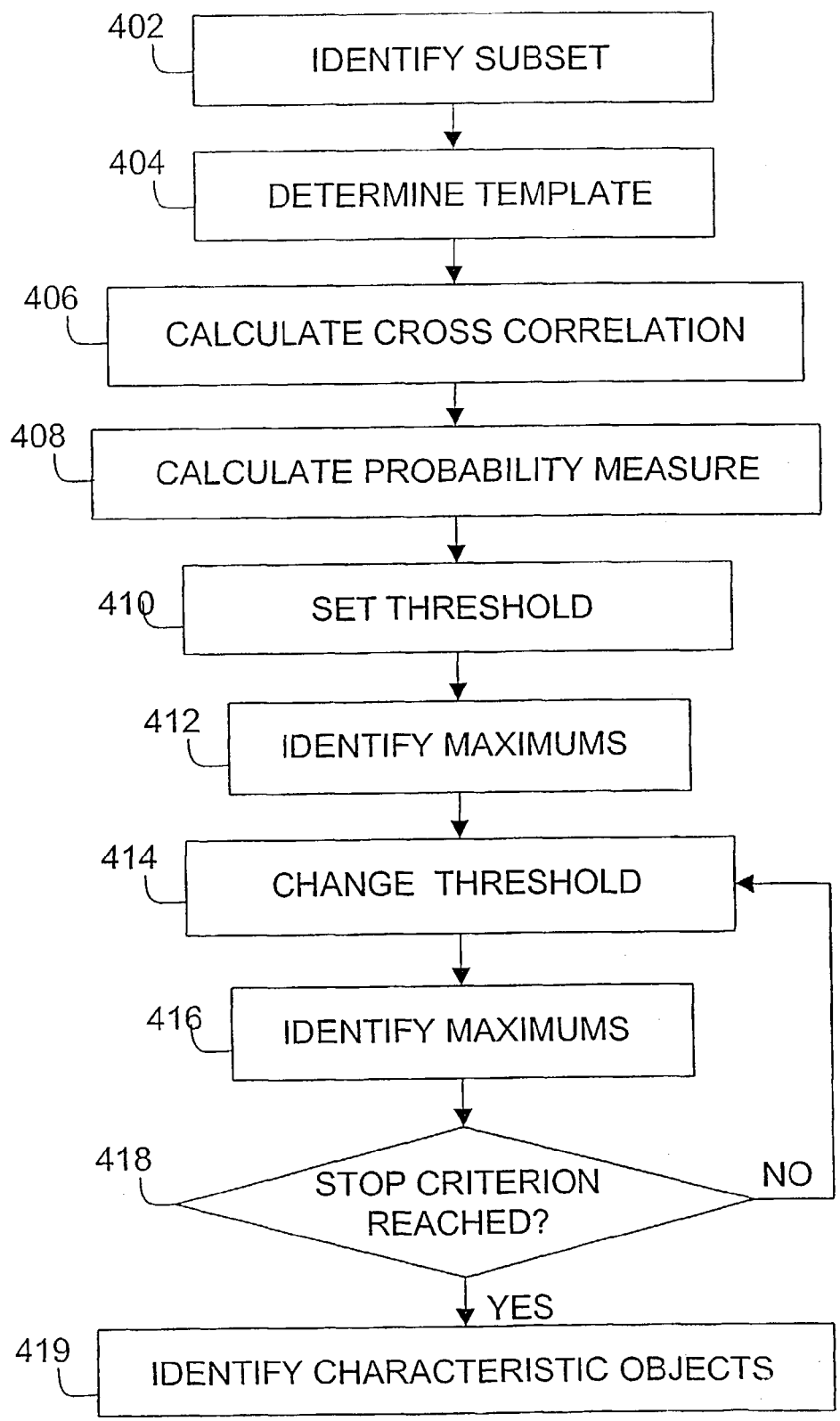
FIG. 4 shows a flow chart of a method for identifying characteristic objects in a digital image in accordance with the invention.
Figure 5:
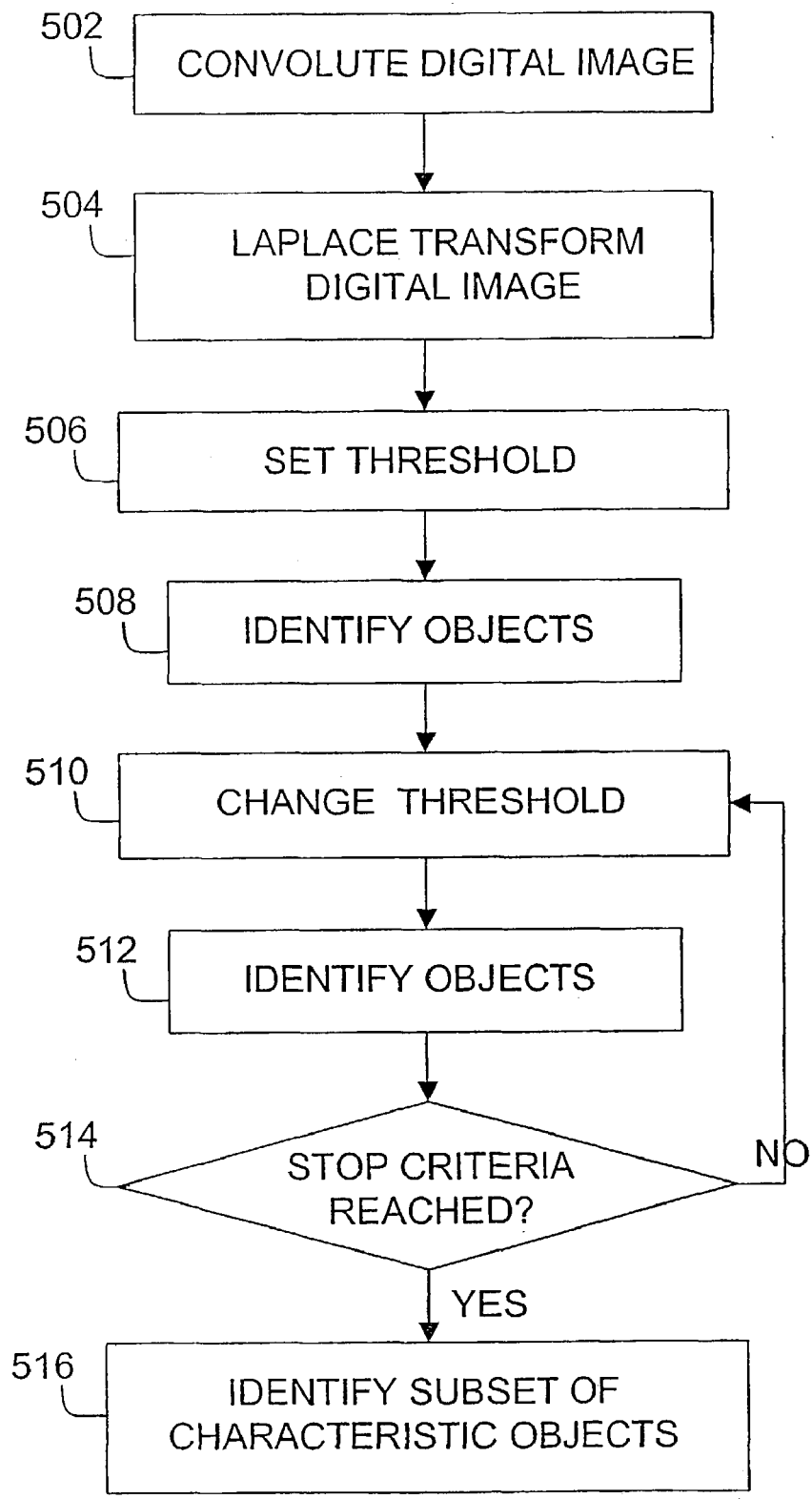
FIG. 5 shows a flow chart of a method for determining a template of the appearance of characteristic objects in a digital image in accordance with the invention.

Turning now to FIG. 4, a flow chart of a method for identifying characteristic objects in a digital image in accordance with the invention is shown. The characteristic objects in the digital image correspond to characteristic parts of an electronic device, such as leads on a component. In step 402, a subset of the characteristic objects is identified. Since only a subset of the characteristic objects is to be identified, any known method for identifying objects in an image can be used that enables the identification of a sufficient number of the characteristic objects. In order to ensure that a sufficient number of characteristic objects are identified, the method described hereinafter with reference to FIG. 5 is preferably used. The reason why only a subset and not all of the characteristic objects are identified in step 402, is that the subset is only used to define a template of the appearance of a characteristic object in step 404. A sufficient number of identified characteristic objects is thus a number that enables the determination of a reliable template. The template is defined from the identified characteristic objects as, for example, an average of their appearances. The determined template describes the typical appearance of a characteristic object in the image, which characteristic object corresponds to a characteristic part of the electronic device. Thus, in order to identify all of the characteristic objects that correspond to characteristic parts, the objects in the digital image that matches the template should be identified. This is done by first calculating the cross correlation between the template and the digital image in step 406. This can be seen as moving the template across the digital image and calculating the cross correlation between the template and the current area of the image. The use of the cross correlation is only an example. Of course, any suitable correlation measure may be used. The maximum values for the cross correlation correspond to possible characteristic objects in the digital image. To further distinguish the maximum values that correspond to characteristic objects, a probability measure is calculated for all maximums in step 408. This probability measure uses a priori knowledge of the geometrical shape of the characteristic parts and enhances maximums that correspond to this geometrical shape. For example, for a characteristic part that is circular a probability measure is used that enhances circular maximums. It has been observed that the probability measures for the maximums that actually correspond to characteristic objects, will be similar and substantially larger than the probability measure for maximums corresponding to other objects. Thus, a threshold value for the probability measure that separates the maximums that correspond to characteristic objects from the other maximums should be determined. This is done by first setting a threshold value in step 410 for this probability measure and identifying a number of maximums that have a probability measure that is higher than this threshold value in step 412. The threshold value is then decreased in step 414 and a new number of maximums that have a probability measure that is higher than this decreased threshold value are identified in step 416. In step 418 a stop criterion is tested. The stop criterion is whether the number of identified maximums has not increase during a predetermined number of iterations. If the stop criterion is not true, step 414 and step 416 are repeated. If the stop criterion is true, this indicates that a probability measure that is lower than the probability measure for all maximums that correspond to characteristic objects has been reached. Thus, if the stop criterion is true, the possible characteristic objects that correspond to the maximums of the cross correlation that have a probability measure that is higher than the last threshold value are identified as the characteristic objects.

As mentioned above, a subset of the characteristic objects can be identified by means of any known method of identifying objects in a digital image when determining a template of the appearance of a characteristic object. However, in the following a preferred method for this is described with reference to FIG. 5. This description concerns a digital image where the characteristic objects are brighter than the rest of the digital image. First the digital image is convoluted with a Gaussian kernel in step 502. This is done in order to suppress objects in the image that are small in comparison to the standard deviation of the Gaussian kernel. Thus, if one knows the approximate sizes of the characteristic objects, the Gaussian kernel is chosen so that objects that are smaller than the characteristic objects are suppressed. If one does not know the sizes in advance, the method needs to be repeated for different Gaussian kernels. In step 504 the convoluted image is then transformed using a Laplace transform. A threshold value is then set in step 506 and the objects in the convoluted and Laplace transformed image with values below this value are identified in step 508. The threshold value is preferably set low from the start, e.g. to the lowest value of the convoluted and Laplace transformed image. The threshold value is then increased in step 510 and the objects in the convoluted and Laplace transformed image with values below this value are identified in step 508. Then, in step 514 stop criteria are tested. The stop criteria are that the number of identified objects is a predetermined number or that the number of identified objects has decreased between the iterations. If none of the criteria are true the steps 510 and 512 are repeated. If one of them is true the iteration is stopped and the subset of characteristic objects is identified as the objects with values below the last but one threshold value. The first stop criterion ensures that a sufficient number of characteristic objects are found, while the second stop criterion ensures that the search is stopped when the threshold value is so high that objects in the convoluted and Laplace transformed image begin to merge. For a digital image where the characteristic objects are darker than the rest of the digital image a similar method is used. However, in this case the threshold value is preferably set high from the start, e.g. to the highest value of the convoluted and Laplace transformed image, and then decreased. In this case objects with values that exceed the threshold value are identified.

Figure 6:
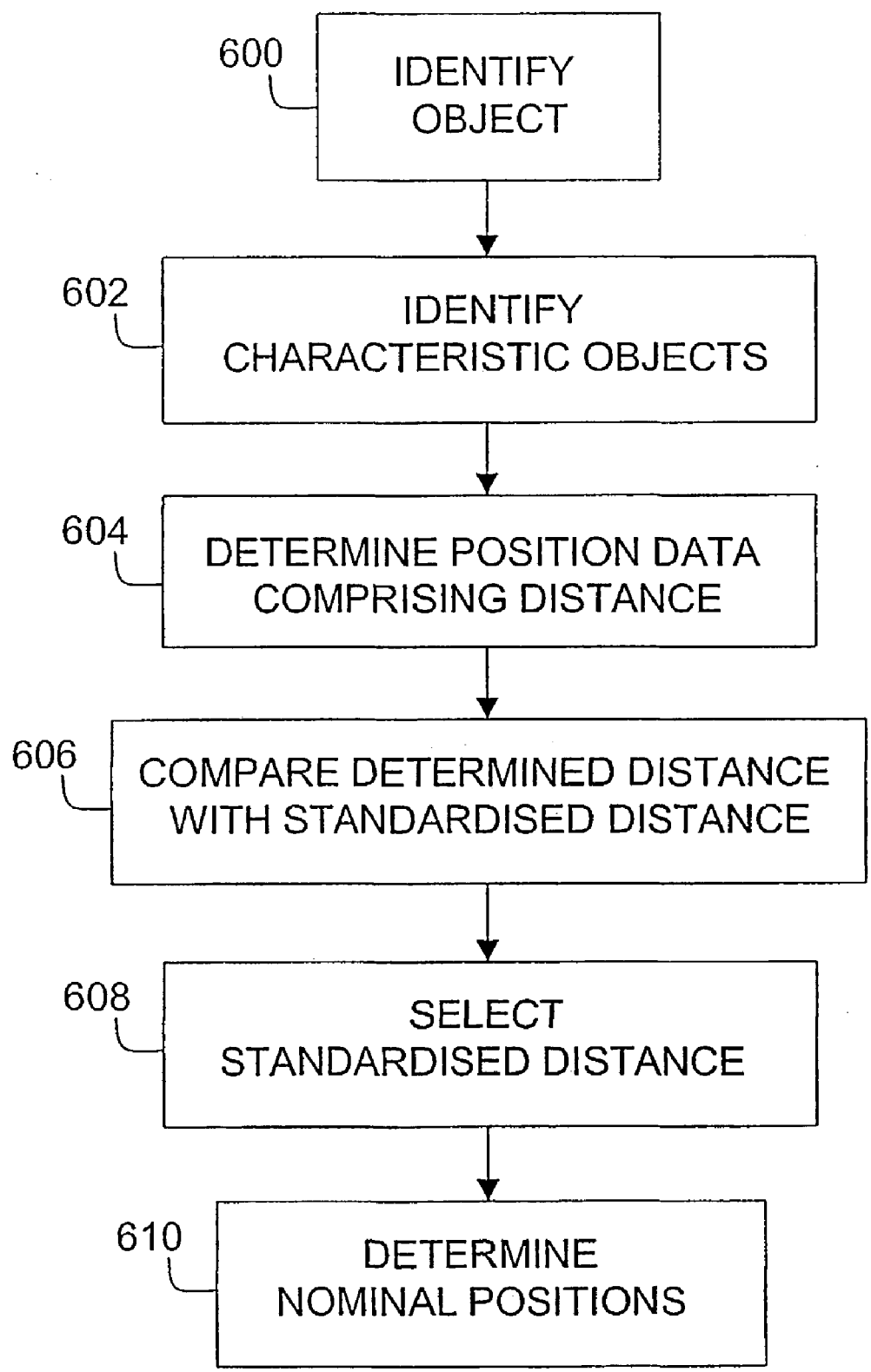
FIG. 6 shows a flow chart of a method for determining the nominal positions of leads on a component.

In FIG. 6 a flow chart of a method for determining the nominal positions of leads on a component by means of automatic image processing of a digital image of a specimen of the component in accordance with the invention is shown. The method uses automatic image processing of a digital image of a specimen of the component for which the nominal positions of leads should be determined, such as a component with leads on the edges of the component body arranged in groups, for example a QFP component. In step 600 an object is identified in the digital image, which object corresponds to the specimen. This identification is done using any method of identifying objects in a digital image by means of image processing. In step 602 characteristic objects corresponding to leads on the component are identified. This identification may also be done using any method of identifying objects in a digital image by means of image processing, but is preferably done using the method described with reference to FIG. 4. After the characteristic objects have been identified, position data are determined for the positions of them in step 604. In the example of a component with leads on the edges of the component, the determined position data could comprise the distance between adjacent characteristic objects. When the position data has been determined it is compared with a set of nominal position data in step 606. The set of nominal position data is based on an a priori knowledge of the positions of leads. The a priori knowledge being that there is a set of standardised ways for how leads occur on different types of components. For the example where the component has leads on the edges of the component, this type of component should have an equal number of leads in corresponding groups of leads on opposite sides of the component. Furthermore, the distance between adjacent leads should be constant within a group of leads. In step 608 the standardised distance between leads of a set of standardised distances between leads is selected. In the example where the components has leads on the edges of the component, the standardised distance between leads that is closest to the determined distance between adjacent leads is selected. Then, if the comparison of the determined position data with the set of nominal position data indicates that there are one or more characteristic parts, i.e. leads, for which no corresponding characteristic objects have been identified, the nominal positions of these one or more leads are determined in accordance with the set of nominal position data in step 610. In the example where the component has leads on the edges, it is determined that there are one or more leads for which no corresponding characteristic objects have been identified for the case when there is one lead less in a group of leads on a first side of the component than in a corresponding group of leads on the opposite side of the component, and the distance between two of the leads that are adjacent to each other on the first side of the component differs from the selected nominal distance between adjacent leads. Furthermore, if the comparison of the determined position data with said set of nominal position data indicates that there are one or more characteristic objects that do not correspond to leads, the nominal position for these one or more characteristic objects are not determined in step 610. In the example where the component has leads on the edges, it is determined that there are one or more characteristic objects that do not correspond to leads for the case when there is one lead more in a group of leads on a first side of the component than in a corresponding group of leads on the opposite side of the component, and the distance between two of the leads that are adjacent to each other on the first side of the component differs from the selected nominal distance between adjacent leads.

It is to be noted that the order of the determinations of missing or excessive characteristic objects could he the opposite, and that one, the other or both could be performed.

Even though the invention has been elucidated above with reference to embodiments adapted to determining nominal data for electronic devices with respect to positions of characteristic parts of the electronic device, such as leads on a component, the invention is equally applicable for determining other mechanical data for an electronic device when there is prior knowledge of the nominal mechanical data. For example, the invention is applicable for determining the size and shape of an electronic component of a part thereof. In this case, the nominal appearance data would comprise known standardized sizes and shapes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for determining nominal mechanical data for an electronic device by means of automatic image processing of a digital image of a specimen of said electronic device, comprising the steps of:
   identifying an object in said digital image, which object corresponds to said specimen;
   determining appearance data for the appearance of the identified object;
   comparing at least some of the determined appearance data with a stored set of nominal appearance data, which nominal appearance data are based on a priori knowledge of appearances of electronic devices;
   selecting, in response to said step of comparing, at least some nominal appearance data of said set of nominal appearance data; and
   determining the nominal mechanical data of said electronic device in accordance with the selected nominal appearance data and at least some of said determined appearance data.

2. The method according to claim 1, wherein the nominal appearance data to which said at least some determined appearance data show most resemblance are selected in the step of selecting.

3. The method according to claim 1, wherein said set of nominal appearance data comprises a set of nominal position data for positions of characteristic parts of said electronic device and wherein the nominal mechanical data to be determined are the nominal positions of said characteristic parts of said electronic device, wherein the step of determining appearance data comprises the steps of:
- identifying characteristic objects of the identified object in said digital image, which characteristic objects correspond to said characteristic parts of said electronic device; and
- determining position data for the positions of the identified characteristic objects, and wherein the step of comparing comprises the step of:
- comparing the determined position data with said set of nominal position data.

4. The method according to claim 3, wherein said set of nominal position data comprises nominal distance data for distances between said characteristic parts of said electronic device.

5. The method according to claim 4, wherein the step of determining position data comprises the step of:
- determining distance data for distances between the identified characteristic objects, and wherein the step of comparing comprises the step of:
- comparing the determined distance data with said set of nominal distance data.

6. The method according to claim 4, wherein said set of nominal distance data comprises a set of nominal centre distances between characteristic parts of said electronic device, wherein the step of determining position data comprises the step of:
- calculating centre distances between said identified characteristic objects, wherein the step of comparing comprises the step of:
- comparing the calculated centre distances with said set of nominal centre distances, and wherein the step of determining the nominal positions comprises the steps of:
- identifying, in response to the step of comparing, to which nominal distances of said set of nominal distances said calculated centre distances show most resemblance; and
- determining the nominal positions of characteristic parts on said electronic device, in accordance with the identified nominal centre distances.

7. The method according to claim 6, wherein said centre distances are calculated by means of frequency analysis of said position data.

8. The method according to claim 6, wherein said digital image comprises a matrix of pixels, and wherein the step of calculating centre distances comprises the steps of:
- defining a function of the pixels of at least a part of said digital image, which function has a different value for pixels corresponding to a characteristic object of said characteristic objects than for other pixels;
- frequency transforming said function;
- searching the frequency transformed function for peaks; and
- calculating, from the found peaks, centre distances.

9. The method according to claim 8, wherein said set of nominal centre distances between characteristic parts comprises a set of nominal horizontal centre distances between characteristic parts and a set of nominal vertical centre distances between characteristic parts, wherein the frequency transformed function is a two-dimensional Fourier transform, wherein the step of searching said frequency transformed function comprises the step of:
- searching the Fourier transform, starting from the centre for zero frequency, for the two closest peaks in horizontal direction and vertical direction, respectively, wherein the step of calculating said distances comprises the steps of:
- calculating, from said two closest peaks in vertical direction, the vertical centre distance between said identified objects; and
- calculating, from said two closest peaks in horizontal direction, the centre horizontal distance between said identified objects, wherein the step of comparing said centre distances comprises the steps of:
- comparing said vertical centre distance with said set of nominal vertical centre distances; and
- comparing said horizontal centre distance with said set of nominal horizontal centre distances, and wherein the step of determining the nominal positions comprises the steps of:
- identifying, in response to the step of comparing said closest vertical centre distance, the nominal vertical centre distance of said set of nominal vertical centre distances to which said centre vertical distance is closest,
- identifying, in response to the step of comparing said horizontal centre distance, the nominal horizontal centre distance of said set of nominal horizontal centre distances to which said centre horizontal distance is closest, and
- determining the nominal positions of characteristic parts on said electronic device according to the identified nominal vertical centre distance and nominal horizontal centre distance.

10. The method according to claim 9, wherein said set of nominal centre distances between characteristic parts comprises a nominal centre distance between characteristic parts for each of a set of nominal grids, further comprising the step of:
- calculating the centre distance between said characteristic objects as the average of the vertical centre distance and the horizontal centre distance, and wherein the step of comparing comprises the step of:
- comparing said centre distance with said nominal centre distance between characteristic parts for each of said set of nominal grids, and wherein the step of determining the nominal positions comprises the steps of:
- identifying, in response to the step of comparing, the nominal centre distance for one of said nominal grids to which nominal centre distance said centre distance is closest; and
- determining the nominal positions of characteristic parts on said electronic device to be positions on said one of said nominal grids with the identified nominal centre distance.

11. The method according to claim 3, wherein said set of nominal position data comprises a set of nominal position data for each of a number of different patterns of characteristic parts, further comprising the steps of:
- identifying the pattern of said number of different patterns to which the identified characteristic objects correspond; and
- selecting the nominal position data for said identified pattern as being representative of said set of nominal position data.

12. The method according to claim 3, wherein the step of identifying characteristic objects comprises the steps of:

determining a template for the appearance of a characteristic object in the digital image;
searching for objects in the digital image that matches the template; and
identifying characteristic objects among the found objects.

13. The method according to claim 12, further comprising the steps of:
identifying a subset of the characteristic objects in said digital image; and
determining the appearance of each characteristic object of the identified subset,
wherein the step of determining a template comprises the step of:
determining the template to be the average of the appearances of the characteristic objects of said identified subset.

14. The method according to claim 13, wherein the step of identifying a subset of the characteristic objects comprises the steps of:
calculating a measure for said digital image, which measure is high for objects that correspond to characteristic parts;
setting a threshold value for said measure;
identifying objects that have a measure that is higher than said threshold value;
decreasing the threshold value;
repeating the two previous steps until the number of identified objects reaches a predetermined number or until there is a decrease in the number of identified objects between repetitions; and
identifying objects with measures that are higher than the last but one threshold value to be characteristic objects in the digital image.

15. The method according to claim 14, further comprising the step of:
convoluting said digital image with a Gaussian kernel which corresponds to the size of a characteristic part of said electronic device,
wherein the step of calculating comprises the step of:
calculating a Laplace transform of the convoluted digital image.

16. The method according to claim 12, wherein the step of identifying characteristic objects comprises the steps of:
calculating a probability measure for each of the found objects describing the probability that the found object corresponds to a characteristic part;
setting a threshold value for said probability measure;
identifying objects of said found objects that have a probability measure that is larger than said threshold value;
decreasing the threshold value;
repeating the two previous steps until the number of identified objects does not increase during a predetermined number of repetitions; and
identifying the objects with a probability measure that is larger than the last threshold value to be characteristic objects in the digital image.

17. The method according to claim 12, wherein the step of searching comprises the steps of:
calculating a correlation measure between the template and the digital image; and
searching for objects in said digital image that correspond to maximums of said correlation measure.

18. The method according to claim 17, wherein the correlation measure is a cross correlation.

19. The method according to claim 3, wherein the determining of nominal positions comprises the steps of:
determining, in response to the step of comparing the determined position data with said set of nominal position data, that there are one or more characteristic parts for which no corresponding characteristic objects have been identified; and
determining, in accordance with said set of nominal position data, the nominal positions of said one or more characteristic parts.

20. The method according to claim 19, wherein it is determined that there are one or more characteristic parts for which no corresponding characteristic objects have been identified for the case when said set of nominal position data comprises one or more positions having no correspondence in said determined position data.

21. The method according to claim 3, wherein the determining of nominal positions comprises the step of:
determining, in response to the step of comparing the determined position data with said set of nominal position data, that there are one or more characteristic objects that do not correspond to characteristic parts; and
refraining from determining the nominal position for said one or more characteristic objects.

22. The method according to claim 21, wherein it is determined that there are one or more characteristic objects that do not correspond to characteristic parts for the case when said set of determined position data comprises one or more positions having no correspondence in said nominal position data.

23. The method according to claim 3, wherein said characteristic parts are leads.

24. The method according to claim 1, wherein said electronic device is a component.

25. The method according to claim 24, further comprising the step of:
storing said nominal position data for use as a reference when analysing the position of a component to be mounted on a printed circuit board.

26. A device for determining nominal mechanical data for an electronic device by means of automatic image processing of a digital image of a specimen of said electronic device, comprising:
storage means in which a set of nominal mechanical data for an electronic device is stored, which nominal appearance data are based on a priori knowledge of appearances of electronic devices;
digital image processing means for identifying an object in said digital image, which object corresponds to said specimen; and
processing means for determining appearance data for the appearance of the identified object, for comparing at least some of the determined appearance data with said stored set of nominal appearance data, for selecting, in response to said comparison, at least some nominal appearance data of said set of nominal appearance data, and for determining the nominal mechanical data of said electronic device in accordance with the selected nominal appearance data and at least some of said determined appearance data.

27. The device according to claim 26, wherein said processing means are arranged to select the nominal appearance data to which said at least some determined appearance data show most resemblance.

28. A device according to claim 27, wherein said set of nominal appearance data comprises nominal position data for positions of characteristic parts of said electronic device, wherein the nominal mechanical data are the nominal positions of said characteristic parts of said electronic device, wherein the digital image processing means are further arranged to identify characteristic objects of the identified object in said digital image, which characteristic objects correspond to said characteristic parts of said electronic device, and wherein the processing means are further arranged to determine position data for the positions of the identified characteristic objects and to compare the determined position data with said set of nominal position data.

29. The device according to claim 28, wherein said set of nominal position data comprises a set of nominal centre distances between characteristic parts, and wherein said processing means are further arranged to calculate centre distances between said identified characteristic objects, to compare the calculated centre distances with said set of nominal centre distances, to identify, in response to said comparison, the nominal centre distances of said set of nominal centre distances to which of said calculated centre distances show most resemblance, and to determine the nominal positions of characteristic parts on said electronic device, in accordance with the identified nominal centre distance.

30. A computer readable medium having computer-executable instructions for a general purpose computer including means for automatic image processing to perform the steps in claim 1.

* * * * *